C. H. KING.
ANVIL ATTACHMENT.
APPLICATION FILED MAR. 26, 1910.
985,262.
Patented Feb. 28, 1911.
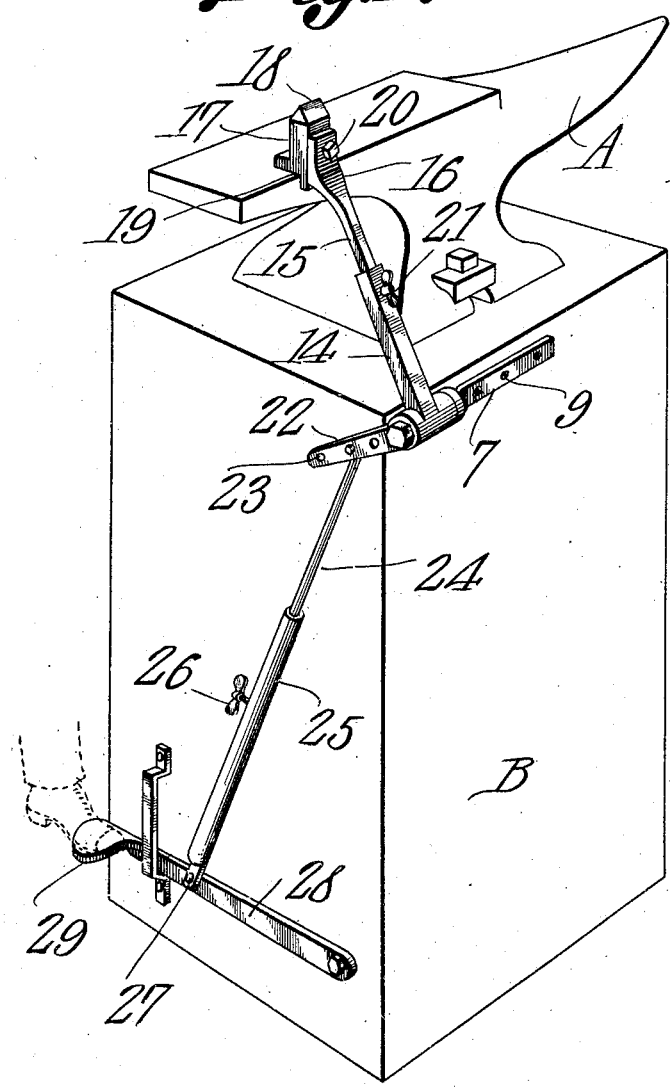
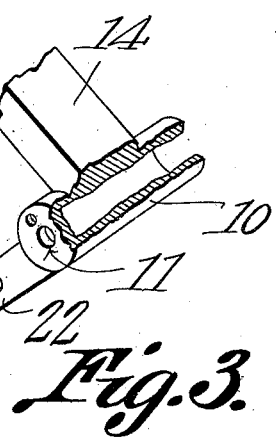
Witnesses
Charles H. King, Inventor,
by ........ Attorneys

UNITED STATES PATENT OFFICE.

CHARLES HERBERT KING, OF ROSEVILLE, ILLINOIS.

ANVIL ATTACHMENT.

985,262.  Specification of Letters Patent. Patented Feb. 28, 1911.

Application filed March 26, 1910. Serial No. 551,748.

*To all whom it may concern:*

Be it known that I, CHARLES HERBERT KING, a citizen of the United States, residing at Roseville, in the county of Warren and State of Illinois, have invented a new and useful Anvil Attachment, of which the following is a specification.

It is the object of the present invention to provide an improved hardy attachment for anvils, the primary aim of the invention being to so construct the attachment that normally the hardy will be supported away from the anvil but, by manipulation of a suitable lever, may be brought to convenient position upon the anvil.

One of the main objects of the invention is to so construct the attachment that it may be readily applied to any ordinary anvil and block by a simple adjustment of certain of its parts and without in any way altering the anvil or block.

Another novel feature of the invention resides in so constructing the hardy and attaching it to its support that the means for connecting the hardy to the support will not be placed under strain when the hardy is being used, the hardy being, however, detachable from its support so that a hardy of a different size may be mounted upon the same support.

In the accompanying drawings,—Figure 1 is a perspective view of the device embodying the present invention. Fig. 2 is also a perspective view but in detail of a portion of the device, and Fig. 3 is a perspective view of a portion of the device which incloses the part shown in Fig. 2.

In the drawings, the anvil is indicated by the reference character A and the block upon which it is mounted is indicated by the reference character B, both the anvil and the block being of the ordinary construction. A spindle 5 is formed at one end with a collar 6 and beyond this collar with a flat attaching portion 7 formed with openings 8 through which are passed screws or other suitable fastening devices 9 which secure the said portion of the spindle to that side of the anvil block B more remote from the side at which the blacksmith stands. A sleeve 10 is formed at one end with an opening 11 and the said sleeve is fitted upon the spindle with the extremity of the spindle projecting through this opening and the opposite open end of the same fitting the collar 6, there being a nut 12 threaded upon the said extremity of the spindle and retaining the sleeve 10 thereon but permitting of its oscillation for a purpose which will presently be made clear. A spring is provided for the purpose of normally holding the sleeve rocked in one direction and this spring 13 has one end fitted in an opening in the collar 6 and is coiled about the spindle and fitted at its other end in an opening in that end of the sleeve in which the opening 11 is formed. It will be readily understood, of course, that the sleeve completely incloses the spring and spindle.

Formed integral with the sleeve 10 and projecting upwardly therefrom is a tubular socket 14 into which is telescopically fitted a stem 15 broadened at its upper end, as at 16, and having a flat face presented toward the anvil A, against which face is disposed one face of the hardy of the device which is indicated by the numeral 17 and has the usual beveled upper end 18. The lower corner of the hardy which is presented toward the anvil A is cut-away at 19 so as to fit exactly against the edge of the anvil when the device is in use. It will be understood from this that the hardy is firmly supported upon the anvil and that there is no stress placed upon the bolt or set screw 20 which serves to detachably hold the hardy to the said upper end of the stem. A set screw 21 is engaged through the tubular socket 14 and bears against the said stem 15 whereby to hold the same at adjustment with respect to the socket, it being understood that by loosening the set screw, the arm consisting of the socket and stem may be adjusted as regards its length so as to position the hardy upon the anvil in connection with which it is to be used, practically regardless of the point of location of the spindle upon the block.

In addition to the tubular socket 14, the sleeve 10 is formed with a downwardly angularly projecting arm 22 formed with a number of openings which are indicated by the numeral 23. This arm projects toward that side of the block at which the operator stands and engaged interchangeably through the openings 23, at its upper end, is a rod 24 fitting telescopically in a tubular arm 25 and held at adjustment therein by means of a set screw 26. The tubular arm 25 is pivoted at its lower end, as at 27, to a lever which is indicated by the numeral 28, and is mounted for vertical swinging movement upon the right hand side of the block B, the forward end of the member having a lateral foot piece 29 and said lever working rearwardly of this foot piece in a guide bracket upon the said side of the block.

From the foregoing description of the invention it will be readily understood that normally the spring 13 swings the hardy carrying arm in a direction away from the anvil and lifts or swings upwardly the foot lever 28. However, when it is desired to make use of the hardy, the blacksmith depresses the lever 28 with his foot and in so doing, causes the hardy carrying arm to swing in the direction of the anvil and bring the hardy to the position upon the anvil illustrated in Fig. 1 of the drawings.

What is claimed is:

In a device of the class described, the combination with a support and an anvil mounted thereon, of a spindle having a portion attached to the support, a sleeve upon the spindle, a helical spring fitted upon the spindle within the sleeve, the spring being secured at one end to the spindle and at its other end being secured to the sleeve, an arm projecting upwardly from the sleeve, a tool carried by the arm, an arm projecting from the sleeve at an angle to the said first arm, the said spring tending to so rotate the sleeve as to swing the said first arm in a direction away from the anvil, and means operable to so rotate the sleeve against the tension of the spring as to swing the said first arm in the opposite direction, said means comprising a lever, and a connection between the lever and the last mentioned arm.

In testimony that I claim the foregoing as my own, I have hereto affixed my signature in the presence of two witnesses.

CHAS. HERBERT KING.

Witnesses:
LYNN GAYMAN,
H. E. LAUER.

---

Copies of this patent may be obtained for five cents each, by addressing the "Commissioner of Patents, Washington, D. C."